United States Patent
Lyngstad

(10) Patent No.: US 8,505,489 B2
(45) Date of Patent: Aug. 13, 2013

(54) TECHNICAL ARRANGEMENT FOR TRANSPORTING LIVE FISH OR SHELLFISH IN WATER

(76) Inventor: Per Lyngstad, Kopervik (NO)

( * ) Notice: Subject to any disclaimer, the term of this patent is extended or adjusted under 35 U.S.C. 154(b) by 1354 days.

(21) Appl. No.: 10/492,867

(22) PCT Filed: Sep. 19, 2002

(86) PCT No.: PCT/NO02/00328
§ 371 (c)(1), (2), (4) Date: Nov. 22, 2004

(87) PCT Pub. No.: WO03/032721
PCT Pub. Date: Apr. 24, 2003

(65) Prior Publication Data
US 2005/0076848 A1    Apr. 14, 2005

(30) Foreign Application Priority Data
Oct. 17, 2001    (NO) .................................. 20015043

(51) Int. Cl.
*A01K 63/02*    (2006.01)
(52) U.S. Cl.
USPC ........................ 119/203; 119/201; 119/202
(58) Field of Classification Search
USPC ......... 119/200–203, 417, 453, 496; 206/205; 43/54.1, 55
See application file for complete search history.

(56) References Cited

U.S. PATENT DOCUMENTS

| | | | | |
|---|---|---|---|---|
| 2,652,807 A | * | 9/1953 | Washburn | 119/203 |
| 3,228,542 A | * | 1/1966 | Achammer | 414/373 |
| 3,387,587 A | * | 6/1968 | Smith et al. | 119/211 |
| 3,390,898 A | * | 7/1968 | Sumida | 285/34 |
| 3,687,111 A | * | 8/1972 | Epper | 119/201 |
| 4,009,792 A | * | 3/1977 | Sano et al. | 414/512 |
| 4,037,475 A | * | 7/1977 | Topham | 73/863.01 |
| 4,038,945 A | * | 8/1977 | Taborsky | 119/224 |
| 4,203,389 A | * | 5/1980 | Gasper et al. | 119/263 |
| 4,274,789 A | * | 6/1981 | Martin et al. | 414/501 |

(Continued)

FOREIGN PATENT DOCUMENTS

| | | |
|---|---|---|
| JP | 6416540 | 1/1989 |
| JP | 6434226 | 2/1989 |

(Continued)

OTHER PUBLICATIONS

Omizu, "Tank, System and Method for Transportation of Living Fish and Shellfish JP 2000-116273 Translation", http://www19.ipdl.inpit.go.jp/PA1/cgi-bin/PA1DETAI.*

(Continued)

*Primary Examiner* — Joshua J Michener
(74) *Attorney, Agent, or Firm* — Marger Johnson & McCollom PC

(57) ABSTRACT

A method and technical arrangement for efficient bulk transport of live fish or shellfish in water in a storage container, wherein the transport of such live organisms may last several hours or days. The storage container and various pieces of other necessary technical equipment used to keep the organisms alive, are placed in physical connection to at least one transport module which is arranged in shape and size to fit together with, or into, a transport container, preferably a standardized container. The container is attached to and carried by means of an ordinary surface transport means, including boat, railway, lorry or car.

14 Claims, 2 Drawing Sheets

(56) References Cited

U.S. PATENT DOCUMENTS

| | | | | |
|---|---|---|---|---|
| 4,654,147 | A | * | 3/1987 | Bagley .......................... 210/744 |
| 4,709,577 | A | * | 12/1987 | Thompson .................... 73/40.7 |
| 5,097,795 | A | * | 3/1992 | Adey ............................ 119/262 |
| 5,117,777 | A | * | 6/1992 | Takasugi ...................... 119/203 |
| 5,138,975 | A | * | 8/1992 | Walsh ........................... 119/203 |
| 5,310,427 | A | * | 5/1994 | Manome ....................... 119/201 |
| 5,377,622 | A | * | 1/1995 | Lauttenbach et al. ........ 119/200 |
| 5,406,740 | A | * | 4/1995 | Wilkin .............................. 43/56 |
| 5,433,763 | A | * | 7/1995 | Shagott et al. ................. 55/323 |
| 5,572,952 | A | | 11/1996 | Manome |
| 5,606,935 | A | * | 3/1997 | Hanrahan ..................... 119/203 |
| 6,058,763 | A | * | 5/2000 | Shedd et al. ................. 73/61.41 |
| 6,148,769 | A | * | 11/2000 | Pack ............................. 119/225 |
| 6,256,905 | B1 | * | 7/2001 | White ............................. 34/467 |
| 6,393,899 | B1 | * | 5/2002 | Shedd et al. ................. 73/61.41 |
| 6,584,935 | B2 | * | 7/2003 | Zohar et al. .................. 119/204 |
| 6,632,347 | B1 | * | 10/2003 | Buckley et al. .............. 205/620 |
| 6,641,732 | B1 | * | 11/2003 | Cheyne ......................... 210/615 |
| 6,789,391 | B2 | * | 9/2004 | Graham et al. ................ 62/52.1 |
| 2004/0118359 | A1 | * | 6/2004 | Badell ........................... 119/203 |

FOREIGN PATENT DOCUMENTS

| | | | |
|---|---|---|---|
| JP | 2234619 | A | 9/1990 |
| JP | 4200334 | A | 7/1992 |
| JP | 05103561 | A * | 4/1993 |
| JP | 06046718 | A * | 2/1994 |
| JP | 2000116273 | | 4/2000 |

OTHER PUBLICATIONS

Translation, Omizu, JP 2000116273.*

Dictionary.com Unabridged, based on the Random House Dictionary, http://dictionary.reference.com/browse/module, © Random House, Inc. 2009, Dictionary.com, LLC. Copyright © 2009.

Dictionary.com Unabridged, based on the Random House Dictionary, http://dictionary.reference.com/browse/room, © Random House, Inc. 2009, Dictionary.com, LLC. Copyright © 2009.

* cited by examiner

TECHNICAL ARRANGEMENT FOR TRANSPORTING LIVE FISH OR SHELLFISH IN WATER

BACKGROUND OF THE INVENTION

1. Field of Invention

This invention relates to a method and a technical arrangement for transporting live fish or shellfish, wherein live fish/shellfish are placed in a container containing water, and wherein the container is transported by means of an ordinary means of surface transport, including boat, railway, lorry or car, and wherein the transport of such live organisms may extend over several hours or days.

2. Background of the Invention

The invention has its background in the many practical problems and drawbacks connected to known methods, arrangements and systems for is transporting fish raw materials in the form of fish or shellfish. This must be viewed in particular in the light of a strong growth in the world population, which has resulted in the transport of increasingly large amounts of foodstuffs, among them fish raw materials, over increasingly large distances and/or for a long time from a place of origin to a place of use, and possibly across frontiers. Therefore, to allow transport of large amounts of fish raw materials, it must be possible for the transport to be carried out in a highly efficient manner, both as regards individual transports and, especially, as regards individual transports made into a system (transport system).

In addition, it must be possible for fish and shellfish to be delivered in a satisfactory quality at the relevant place of use. In many consumer markets a satisfactory quality amounts to a whish for fresh foods, and for this reason the demand in the market for live fish and shellfish is constantly increasing. This increase in demand has resulted in, i.a., a large growth in existing and related farming activities, but also in the establishment of new types of farming activities, both as regards types of farmed organisms, types of farming facilities and as regards farming locations. Additionally it is expected that in future both existing and newly established farming activities will expand greatly. In this connection there is also expected an increasing need for transporting live farmed organisms of different types and possibly in different phases of development, including fry for farming, between different geographical locations.

To be able to meet both the existing and coming needs for transport of large quantities of live fish and shellfish, the fish raw materials must, as mentioned, be carried by means of efficient transport systems. On the one hand a transport system is a logistics manoeuvre, whereas on the other hand it is the provision and assembling of technical devices, arrangements and methods that are necessary in order to carry out this logistics manoeuvre. This invention deals with the technical aspect of a transport system, and the invention thus deals with suitable arranging and assembling of technical devices, arrangements and methods which increase the is efficiency of the transport system as regards bulk transport of live fish and shellfish.

Known Technique

Freezing, cooling, canning, salting and drying represent known methods of preventing different foodstuffs, among them meat from different organisms including i.a. fish and shellfish, from going bad or being spoilt in time. Therefore, most of said methods are well suited for preserving the foodstuff when it is transported across large distances and/or for a long time. With a few exceptions, all of said methods assume that the organism from which the meat originates, is put to death before the meat is preserved. Therefore, such a meat product is normally not considered as fresh food, even though some such meat products, e.g. newly slaughtered fish cooled in ice cubes, are commonly referred to as fresh food as they are sold/consumed in their cooled state shortly thereafter. On the other hand, for a shorter period of time, e.g. for one day, it is possible to cool and store, e.g. during transport, live shellfish, e.g. mussels and oysters, before they are sold/consumed shortly thereafter.

In the following, on the other hand, examples are given of known technique comprising devices, facilities and methods for use in the transport of live fish.

The patent publication NO 6786 from the year 1897 discloses a "Transport carriage for live fish with an automatically working watering device". In principle this "watering device" is a pump device which is placed and arranged in the transport carriage in such a way that it is started when the carriage, for example a railway carriage, is put into motion, whereupon water is pumped and circulated through the vessel filled with water.

The patent publication NO 8046 from the year 1898 also discloses a "Carriage for the transport of live fish", in which the carriage is for example a railway carriage. The carriage is provided with a fish container filled with water, and other apparatus located externally to the container for filtering the water and for controlling the air saturation of the water and the temperature. Thereby the carriage should allow use across very long distances and in changing temperature conditions, and this without the water having to be replaced. The invention thus deals with technical features of the carriage, mainly the fish container and its associated devices, materials and equipment, which are necessary in order to give the fish the living-conditions necessary during transport in order for them to survive.

The patent publication No 53182 from the year 1931 discloses on the other hand a "Car for transporting live fish", and the publication discloses in particular a device for the replenishing of water in a fish container on the car. Similar to that of NO 8046, this fish container is also, through suitable pipes, provided with a circulation device connected to a filtration apparatus and an air supply apparatus for treating the water. The invention is distinguished moreover by a heating device, which will prevent the circulation pipes from freezing, and thereby will give the water a temperature suitable for the fish.

The Norwegian patent application 891163 discloses a "Device for transporting live fish" in a container. During transport the fish often gather at the bottom of the container, and this may lead to mechanical damage and/or oxygen-lack for the fish.

Therefore, the invention consists in arranging the container in such a way that a vertically directed flow of water rich in oxygen is created, which is forced through the live fish mass within the container, whereupon the water flow lifts the fish up from the bottom of the container, preventing mechanical damage from being caused to the fish.

The Norwegian patent application 863276 discloses a "Plant for the transport of live fish, especially smolt". The application discloses a cylindrical fish container which is arranged through its structural features and associated equipment in such a way that water is re-circulated at a specific flow rate which is favourable to the survival of the fish in the container.

The patent publications NO 170613 and U.S. Pat. No. 5,220,880 disclose methods and apparatus for transporting and storing live fish. As opposed to the above-mentioned inventions, both inventions deal with the use of a case or a compartment in which the live fish are placed individually during transport, and in which, during the transport/storage, water provided with suitable properties is flowing through the case/compartment, giving the fish the necessary living conditions.

The patent publications U.S. Pat. Nos. 4,844,012, 5,117, 777 and U.S. Pat. No. 5,309,868 also deal with transport of live fish. These publications assume, as opposed to all the above-mentioned publications, that during the transport the fish are put into a passive or hibernation-like state. In this state a collection of fish will stay calm, whereby mechanical damage to the fish is essentially avoided. Thereby fish may be gathered in larger concentrations and thereby be carried in a smaller transport volume than when the fish are active. In U.S. Pat. No. 4,844,012 common species of fish are rendered passive in that a state of so-called "piscine immobility syndrome" is induced in the fish, which is a kind of hypnotic immobility state. According to the publication this state is achieved by physically restricting the movement of the fish and at the same time supply the fish with water of good quality. In U.S. Pat. Nos. 5,177,777 and 5,309,868, on the other hand, the fish are put into a hibernation-like state in that the fish are cooled to a temperature within a specific temperature range which is not harmful to the fish, after which the fish are kept cooled within this temperature range during transport. After the transport the fish may possibly be activated in that the temperature is increased to its normal temperature. Otherwise, all three publications disclose assemblies of devices and equipment, including suitable storage containers, which are used in order to transport the fish in this passive or hibernation-like state and to give the fish the necessary living conditions for them to survive the transport.

Drawbacks of Known Technique

The above-mentioned publications concerning known technique for transporting live fish or shellfish mainly focus on methods and technical means, including suitable storage containers and devices/equipment, for keeping the fish/shellfish alive during their transport by a suitable means of transportation. The publications focus by and large on describing these means seen in relation to individual transports and not in relation to individual transports made into systems (transport systems). In these publications the means of transportation is mentioned only as a technical necessity to allow transportation of the fish products, so that the means of transportation is of subordinate importance relative to the inventive contents of the publications. Thus, the publications focus to a small degree on how such technical means in a larger connection may be assembled and arranged to the means of transportation in order thereby to enable an efficient bulk transport of live fish and shellfish across large distances and/or for a long time. On the other hand, this is a technical challenge which the present invention seeks to remedy.

The publications U.S. Pat. Nos. 4,844,012, 5,117,777 and 5,309,868 do indeed disclose methods and apparatus for rendering fish passive during transport, so that the fish may thereby be carried concentrated and alive in a small, and thereby relatively light-weight, transport volume. This concentration of fish thus represents an efficiency improvement relative to transport volume, and thereby transport weight, which is of particularly great importance in transport by air. Keeping the fish in a pacified state during their transport, requires on the other hand that the user i.a. understands, and can utilize, the mechanisms that render the fish passive. For this purpose is also required the use of relatively comprehensive and/or complex devices/equipment, including special storage containers and equipment for controlling/monitoring the survival parameters of the fish, in particular the temperature, in order to keep the fish alive in a harmless way during transport. From this it appears, i.a., that the methods assume the use of relatively expensive, complex and comprehensive technical equipment. In practice this limits the use of the methods to relatively special fields of application, including transport by air and/or to the use for special users/customer groups. In such connections such methods and associated apparatus may be well suited for carrying concentrated amounts of live fish across large distances. For bulk transport, on the other hand, the methods are, due to their technical limitations of use and poor cost-effectiveness, not very suitable for transporting live fish or shellfish in an efficient way.

OBJECT OF THE INVENTION

The object of the present invention is to provide a method and a technical arrangement which allow efficient and flexible bulk transport of live fish and shellfish across large distances and/or for a long time, and in which the above-mentioned defects, problems or drawbacks of known technique are remedied. It should also be possible for the invention to be practiced by means of i.a. known, and to the fish/shellfish life-supporting, technical means, established transport systems and ordinary surface transport means, including boat, railway, lorry or car.

Realization of the Object/Advantages of the Invention

According to the invention, the object is achieved in that in physical connection to at least one supporting structure of a suitable size and design there is placed a suitable storage container containing water of a suitable quality and live fish or shellfish placed therein, and that in the at least one supporting structure there are also placed various other pieces of technical equipment, which must be connected to the storage container with the aim of providing the necessary living conditions for the fish or shellfish in the storage container. Such a supporting structure may be formed by for example a frame, foundation, shell, case, housing or tank partly or completely surrounding the technical equipment in question. The at least one supporting structure, the storage container and the other technical equipment are assembled into a technical arrangement consisting of at least one transport module, the at least one transport module being arranged with an external shape and size which fit together with or into a suitable transport container of a preferably standardized size, e.g. a 20 feet standardized container. Otherwise, the transport container is arranged to be attached to and carried by an ordinary means of surface transport. Used in a standardized transport system, and in connection preferably with a standardized container, a technical arrangement consisting of at least one such transport module, may thereby be carried over long distances, possibly across frontiers, without the storage container and/or its associated technical means, having to be adapted or changed, for example, because of local conditions, or the fish/shellfish having to be transferred, for example, due to such conditions, to a storage container of another type/size. Such a transport module and such a transport container will in the following be referred to, simplified, as a module and a container, respectively.

Moreover, in physical contact with the container, said technical arrangement is preferably arranged movable relative to the container. This relative movement in the form of a displacement/transfer may be obtained in that the at least one module and/or container is provided with suitable moving devices, including wheels, rollers or rails. Thereby the at least one module may be moved with ease relative to the container. Additionally, by means of such moving devices two or more such modules may easily be moved relative to each other. Thus the at least one module may with ease be placed into, or removed from, the container. For example, the at least one module may be provided with wheels, whereas the floor of the container is provided with cooperating rails, so that the wheels may run on and along the rails when the at least one module is brought into or out of the container. Correspondingly, in a stationary place, e.g. at the place of origin or the place of use of the fish/shellfish, rails may be positioned on a suitable floor, on which rails the at least one module may be displaced/moved, possibly anchored. Alternatively, transport rollers may be positioned on said floor(s), along which the at least one module may be displaced/moved.

Said technical arrangement may be provided with further application flexibility in that, for example, the storing container is placed in one module, whereas the associated and necessary technical means, including life-supporting equipment, are placed in at least one other separate module within the same container. As an alternative to this, some of this necessary technical equipment may be physically connected to the module with the storage container, whereas the rest of the necessary technical equipment is physically connected to at least one other separate module positioned within the same container. Technical equipment in one module is preferably releasably connected to cooperating technical equipment in the other module(s) of the arrangement, e.g. by the use of releasable quick-release couplings between modules of the arrangement. Thereby, pieces of technical equipment of different modules in the container may easily be connected to or disconnected from each other. Besides, pieces of said technical equipment are preferably interconnected by a common panel for control, adjustment and monitoring of both this equipment and the water quality within the storage container. This panel is preferably placed in suitable proximity to an access opening in the container, so that the control panel may easily be observed or operated. If necessary, the container must also be arranged with other suitable openings, e.g. an opening for waste water and/or an opening for the supply of air, and possible openings for the passage of various cables or wires, including wires for supplying electricity.

The application flexibility that such a technical arrangement is thereby provided with, results in the fact that such modules may easily be placed into, or removed from, a container, and that the arrangement may easily be adapted for the current need. Thereby, for example repairs, maintenance or replacements of technical means in one or more modules may be carried out with ease. This application flexibility may also be utilized in the way that a storage container containing live fish or shellfish may easily be replaced with another storage container, e.g. an empty storage container or some other type of container, possibly with another container containing another type of live fish raw material. Thus there is also freedom to choose whether one or more other modules containing other necessary technical means, e.g. life-supporting technical means, monitoring equipment and control equipment, should accompany the storage container when this is replaced or removed. For example, the necessary, but separate, additional equipment for the storage container may be placed in a standardized module for such additional equipment. The additional equipment of this module may at the same time be of such a type that it may easily be adjusted to different operational conditions, different types of storage containers and/or different living conditions required by the species of fish or shellfish-relevant for such transport.

As a further consequence of this application flexibility, modules containing both the storage container and other necessary equipment may be removed from the container after transport, and the modules may be placed at a stationary place, e.g. a place of origin or a place of use. Thereby all necessary and life-supporting equipment is placed at the stationary site, so that the fish/shellfish may still be stored alive in the storage container, even after the transport means and container have left the place. If the stationary place is already provided with such necessary equipment, only the module with the storage container is removed from the container and connected to the stationary equipment. As mentioned, to one or more equipment modules remaining in the container there may subsequently be connected a possible new storage container module coming either from the same place or from elsewhere.

Said other necessary technical means may for example be constituted by life-supporting technical means, monitoring equipment and control equipment. Such life-supporting technical means include, in this connection, various pieces of technical equipment for maintaining a quality of the water in the storage container satisfactory to the fish/shellfish. Such equipment may for example consist of circulation pumps, equipment for cooling/heating the water, equipment for adjusting the oxygen content, pH-value and/or salt content of the water, and equipment for filtering and purifying the water. In addition, such modules must be equipped, to the extent required, with various pieces of other technical equipment, e.g. lights, wires, pipes, hoses, valves and connectors of suitable types, sizes and materials, as such equipment is used, i.a., for connecting the other technical means of the modules. Even if such equipment is of a necessary, subordinate importance to the invention, this equipment is regarded, on the other hand, as being of a professional character, and its constructional features and operation will therefore not be described further.

BRIEF DESCRIPTION OF THE DRAWINGS

In the following part of the description, and referring to the appended drawn figures, non-limiting exemplary embodiments of the present invention will be described. One specific reference numeral refers to the same detail in all drawings where this detail is indicated.

In other respects, pieces of technical equipment shown in the drawn figures are shown simplified and distorted as concerns their relative sizes, lengths and transverse dimensions, but also as concerns details and extent of this equipment.

DETAILED DESCRIPTION OF PREFERRED EMBODIMENT(S)

Various pieces of technical equipment necessary for practicing the method, but not directly concerned with the invention itself, are not indicated in further detail or described in the following examples of embodiments. Such equipment may for example include various pipes, hoses, wires, connectors, valves and pumps, but also various components and equipment, including electronic circuits, programs and sensors for monitoring, controlling and/or adjusting i.a. water quality and operation parameters.

Figure 1:
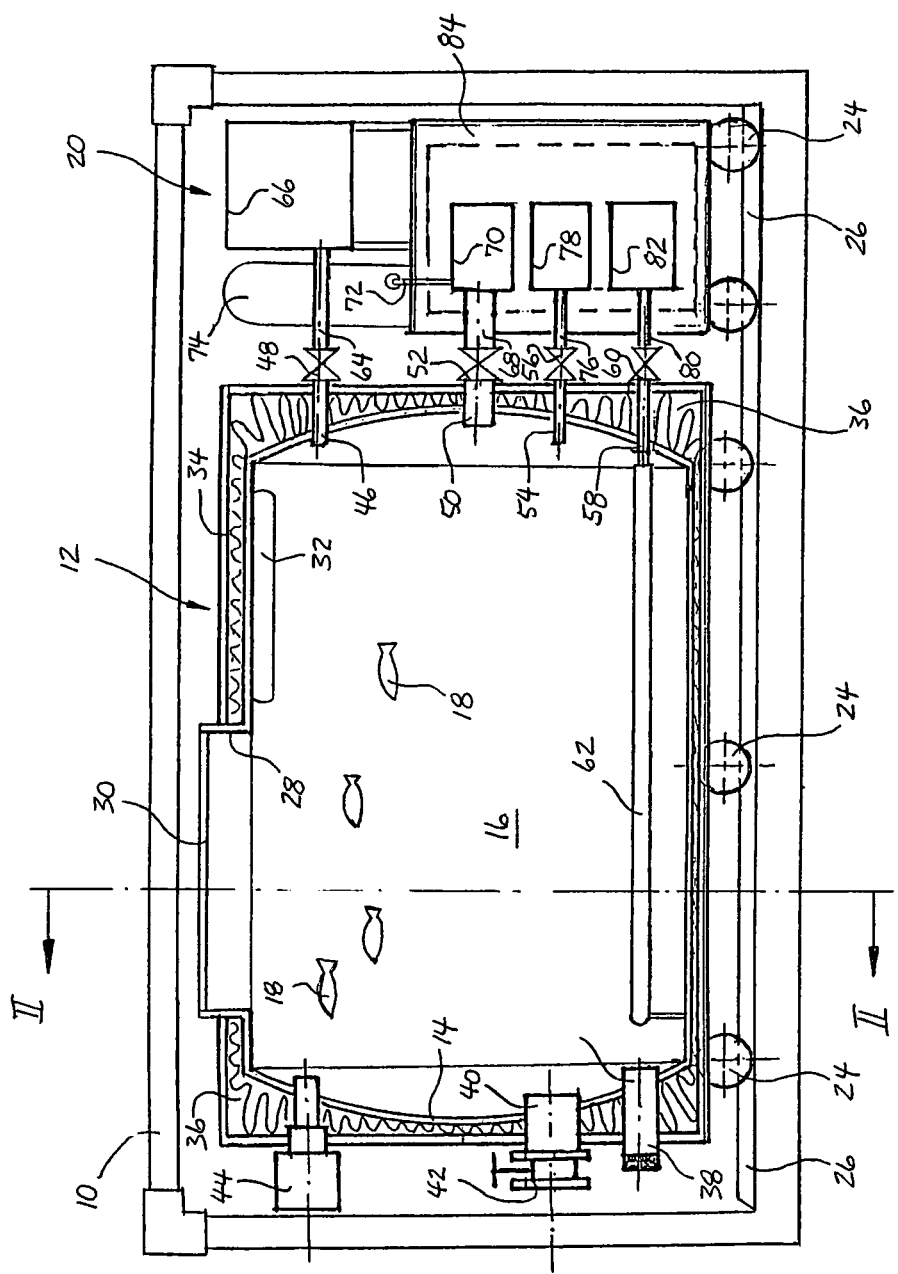
FIG. 1 showing a vertical section longitudinally through a container, in which there are placed a module with a storage container for live fish and an associated module with the other necessary technical means, the figure also showing the vertical sectional line II-II.
Figure 2:
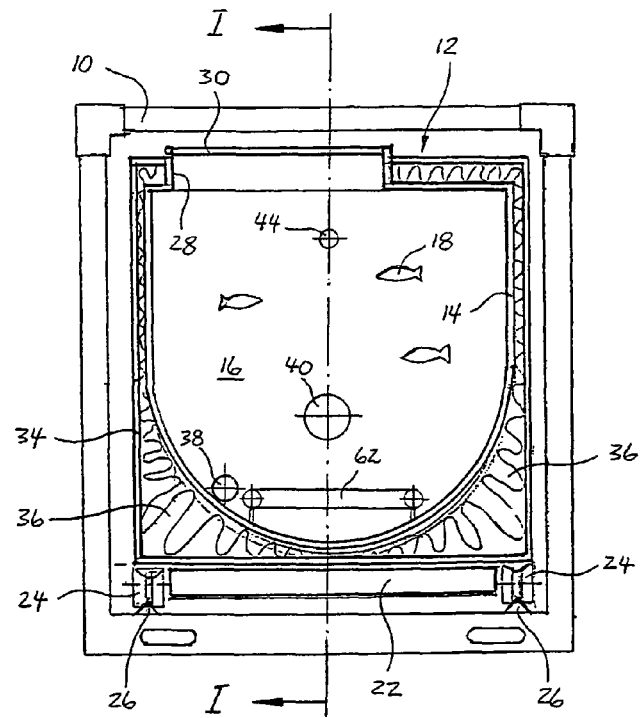
FIG. 2 showing a vertical section transversely through the container and the module with the storage container, the figure also showing the vertical sectional line I-I.

Referring to FIG. 1 and partly FIG. 2, a first exemplary embodiment shows a 20 feet standardized container 10, in which there is placed a module 12 containing a storage container 14 with water 16, in which there have been placed live fish 18. In the container 10 is additionally placed a module 20 containing various other technical equipment which is necessary, directly or indirectly, in order to treat the water 16 to the extent that the fish are given the necessary living conditions in the storage container 14. To reduce the slopping around of water during transport, so that the fish 18 are thriving better, the storage container 14 is preferably completely filled with water 16. Each module 12 and 20 is moreover provided with wheel axles 22, to which castors 24 are rotatably attached The castors 24 are arranged to fit complementarily rails 26 positioned on the floor of the container 10, so that the modules 12 and 20 may thereby roll along and possibly also be locked to the rails 26, cf. FIG. 2.

In its upper portion the storage container 14 is provided with an opening 28 and an associated hatch 30 for access to the storage container 14. Additionally, the upper portion of the container 14 is provided with an internal light source 32 simulating artificial day light and thereby helping the fish 18 to orientate themselves within the storage container 14. In a cavity between the storage container 14 and the outer mantle 34 of the module 12 is disposed a suitable insulating material 36. This insulating material 36 works as a heat-insulating climate barrier between the inside and the outside of the storage container 14, and the material 36 thereby contributes to maintaining a stable temperature in the water 16, even by possible external temperature variations.

In its one end portion the storage container 14 is provided with a thermostat-controlled immersion heater 38 for the possible heating of the water 16. In this end portion the storage container 14 moreover has a pipe passage 40 extending therethrough with an associated external connection valve 42 and a circulation pump 44 to create flow in the water 16. The pipe passage 40 and the connection valve 42 are moreover of sufficiently coarse dimensions for the fish 18 to be allowed to swim or be pumped therethrough. In this exemplary embodiment the pump 44 is conveniently placed in the upper portion of the storage container 14. On activation the pump 44 thereby creates a water flow in the storage container 14, which is at its greatest in the upper layer of the water 16. This condition may be utilized conveniently in connection with some species of fish, including salmon and trout. These fish species like to stand in a counterflow, and fish 18 from such fish species will therefore by nature be attracted to regions in the water 16 with water flow. Therefore, in the storage container 14 the fish 18 will by nature be attracted to an stand in the upper layer of the water 16, where the water flow is at its greatest, so that the fish 18 will get natural exercise, which increases their well-being. This measure also results in the fact that in a natural way the fish 18 are brought away from the walls and bottom of the storage container 14, so that the fish 18 will, to the smallest degree possible, collide with them and suffer mechanical damage.

In its other end portion the storage container 14 has several pipe passages extending therethrough, FIG. 1 showing four such passages. In each passage are placed two pipelines (not shown in the drawn figure), one of which is a pipe inlet and one of which is a pipe outlet, for circulating the water 16, the pipelines being connected to a common external quick-release coupling. The shown pipe passages and quick-release couplings are respectively a pipe passage 46 and a quick-release coupling 48 for cooling the water 16, a pipe passage 50 and a quick-release coupling 52 for supplying oxygen to the water 16, a pipe passage 54 and a quick-release coupling 56 for adjusting the salt content and pH-value of the water 16, and a pipe passage 58 and quick-release coupling 60 for monitoring the quality of the water 16. For samples for analysis to be taken from the water 16 and is its quality thereby to be determined, the pipe passage 58 is connected to a pipe loop 62 disposed inside the storage container 14 and near its bottom. I this exemplary embodiment the water samples are analysed outside the storage container 14 and in the module 20. For this purpose the pipe loop 62 is provided with suitable openings (not shown in the drawn figures) through which the water 16 is circulated into/out of the storage container 14. To the storage container 14 may also be connected a plant/system not shown, for filtering/purifying the water 16, this plant/system possibly also being connected to the storage container 14 by means of a pipe passage and an external quick-release coupling.

Such quick-release couplings, including the quick-release couplings 48, 52, 56 and 60, allow the technical equipment at the module 12 to be releasably connected to cooperating and necessary technical equipment at the module 20, which involves that the modules 12 and 20 may easily be connected to/disconnected from each other as required. This involves that necessary technical equipment at the module 20 is also provided with suitable connecting lines, which are connected through i.a. the quick-release couplings 48, 52, 56 and 60 to the module 12.

In this first exemplary embodiment, cf. FIG. 1, the connecting lines are therefore formed by flexible hoses provided with double flow passages (not shown in the drawn figure), one of which is an inlet and one of which is an outlet for the water 16. The necessary technical equipment at the module 20 is therefore formed mainly by a connecting hose 64 connected to a thermostat-controlled cooling generator 66, a connecting hose 68 connected to a system 70 for the supply of oxygen, the system 70 receiving by a connecting pipe 72 a supply of oxygen from at least one pressure tank 74, a connecting hose 76 connected to a system 78 for adjusting the salt content and/or pH-value of the water 16 and a connecting hose 80 connected to a system 82 for monitoring and controlling the quality of the water 16. Said necessary equipment of the module 20 is moreover suitably arranged in/on a frame structure 84, the frame structure 84 and said equipment in assembly forming the module 20.

In the system 82 are carried out i.a. measuring and registration of different properties of the water 16. The system 82 may include i.a. sensors, known in themselves, for measuring specific values of such properties, for example for measuring temperature, oxygen saturation, salt content, pH-value and/or amount of solids particles in the water 16. Optical sensors may also be used therein for measuring the amount of solids particles, e.g. fish excrement, which are deposited and/or suspended in the water 16. In addition, the system 82 is provided with control equipment, known in itself, for continuously comparing specific measured values of one or more water properties with an optimal range of measuring values for the property in question. Any deviations from the optimal range of measuring values is detected in the system 82, which then outputs corresponding control signals to the relevant equipment of the module 20, so that corrective treatment of the relevant property (properties) of the water 16 may be carried out by means of the relevant equipment. The system 82 may possibly also output suitable alarm signals by such deviations. A temperature increase in the water 16 beyond the optimal temperature range for the fish 18 would for example result in the system 82 detecting the temperature change and outputting a control signal to the cooling generator 66 for this to be started, after which the temperature in the water 16 is thereby lowered to the desired temperature range. Subsequent cooling of the water 16 to the optimal temperature range is also detected by the system 82, after which the system 82 in stead outputs a control signal to the cooling generator 66 for it to stop. Such a control technique is considered to be of a professional character and is therefore not mentioned any further.

Figure 3:
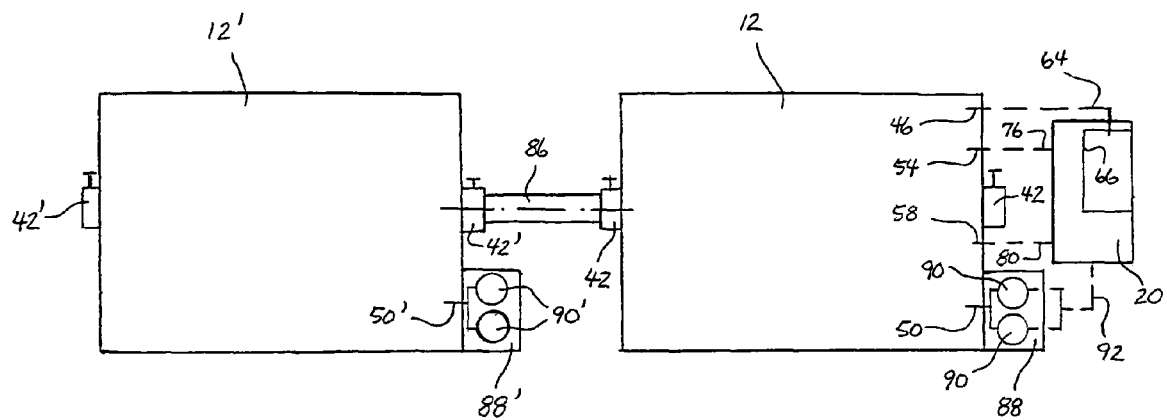
FIG. 3 showing a schematic plan view of two connected modules with storage containers, one of which is a mobile module and one of which is a stationary module, as live fish are being transferred from the mobile module to the stationary module.

In a second exemplary embodiment, cf. FIG. 3, two modules with storage containers, respectively one mobile module 12 and one stationary module 12', are connected by means of a coarsely sized flexible hose 86, live fish 18 being transferred through this hose 86 from the mobile module 12 to the stationary module 12'. The modules 12 and 12' are each provided with two external connecting valves, respectively two connecting valves 42 at the module 12 and two connecting valves 42' at the module 12', one connecting valve 42 or 42' thereof at either end of the module 12 or 12'. Thereby any end of the module 12 may be connected to any end of the module 12'.

As opposed to the module 12 of the first exemplary embodiment, each of the modules 12 and 12' of the second exemplary embodiment is provided with a respective external aggregate 88 and 88' for the supply of oxygen, with pressure tanks 90 and 90' for oxygen. Each aggregate 88 and 88' has suitable sensors connected thereto for measuring the oxygen saturation in the water 16, and, in addition, a system each for adjusting the supply of oxygen to the water 16. Oxygen is carried from each aggregate 88 and 88' into the water 16 through pipe passages 50 and 50'. Even though each module 12 and 12' is thereby self-sufficient in oxygen, such aggregates 88 and 88' are meant to be used preferably for shorter periods of time, and when it is not necessary to use other systems/equipment for treating the water 16, for example by temporary storing of the fish 18 in the water 16 after the fish 18 have been transferred to the stationary module 12', and after the flexible hose 86 has been disconnected therefrom. In this second exemplary embodiment only the mobile module 12 is releasably connected through the aggregate 88 and a connecting hose 92 (shown in dotted line in FIG. 3) to a module 20 with other technical equipment. More specifically the aggregate 88 is connected to a system placed in the module 20 for monitoring and controlling the quality of the water 16, cf. the system 82 of the first exemplary embodiment. The aggregate 88 also replaces the system 70 for oxygen supply, mentioned in the first exemplary embodiment, positioned in the module 20. The other connecting hoses between the modules 12 and 20 are indicated in dotted lines in FIG. 3, the connecting hose 64 thereof being connected to the cooling generator 66, the connecting hose 76 for adjustment of salt content and/or pH-value and the connecting hose 80 for monitoring/controlling the water quality.

The invention claimed is:

1. A technical arrangement for transporting live marine organisms in water, the technical arrangement comprising:
   a first transport module including a storage vessel structured to contain the live marine organisms in the water;
   a second transport module including life-supporting equipment arranged to keep the marine organisms alive during transport thereof;
   a plurality of pipe passages connecting the first transport module with the second transport module;
   a separate transport container structured to enclose the first transport module and the second transport module, the transport container constructed to be carried by ordinary means of surface transport; and
   moving means attached to the first and second transport modules such that the first and second transport modules may be moved into and out of the transport container.

2. The technical arrangement of claim 1, wherein the moving means includes at least one of wheels, rollers, and castors.

3. The technical arrangement of claim 2, wherein the transport container further comprises rails formed on a bottom surface of the transport container, and wherein the moving means attached to the first and second transport modules are structured to interface with the rails.

4. The technical arrangement of claim 3, wherein the moving means is structured to be locked to the rails.

5. The technical arrangement of claim 1, wherein the transport container is a standardized box shipping container structured to be carried and transferred between various means of surface transport.

6. The technical arrangement of claim 5, wherein the transport container is a standardized twenty foot box shipping container.

7. The technical arrangement of claim 1, wherein the separate transport container is structured to enclose only one first transport module and one second transport module.

8. The technical arrangement of claim 1, wherein the plurality of pipe passages each include a quick release coupling.

9. A technical arrangement for transporting live marine organisms in water, the technical arrangement comprising:
   a first transport module including a storage vessel structured to contain the live marine organisms in the water;
   a second transport module including life-supporting equipment arranged to keep the marine organisms alive during transport thereof;
   a plurality of pipe passages connecting the first transport module with the second transport module, the plurality of pipe passages each including a quick release coupling;
   a standardized box shipping container to enclose the first and second transport modules, the standardized box shipping container configured to be carried and transferred between various means of surface transport, wherein the first and second transport modules are structured to fit within the standardized box shipping container;
   moving means attached to the first and second transport modules such that the first and second transport modules may be moved into and out of the transport container.

10. The technical arrangement of claim 9, wherein the storage vessel containing the water is configured to be completely filled with water to reduce the water from slopping around during transport.

11. The technical arrangement of claim 9, wherein the life-supporting equipment of the second transport module further includes at least one oxygen-filled pressure tank for supplying oxygen to the storage vessel in the first transport module.

12. The technical arrangement of claim 9, wherein the first and second transport modules are configured so that only one first transport module and only one second transport module can fit within the standardized box shipping container.

13. The technical arrangement of claim 9, further comprising locking means to lock the moving means relative to the standardized box shipping container.

14. The technical arrangement of claim 9 wherein the storage vessel includes an internal light source to simulate artificial day light.

* * * * *